US009755807B2

(12) United States Patent
Kim et al.

(10) Patent No.: US 9,755,807 B2
(45) Date of Patent: *Sep. 5, 2017

(54) UPLINK CHANNEL ESTIMATION USING A SIGNALING CHANNEL

(71) Applicant: QUALCOMM Incorporated, San Diego, CA (US)

(72) Inventors: Byoung-Hoon Kim, Seoul (KR); Durga Prasad Malladi, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 14/754,033

(22) Filed: Jun. 29, 2015

(65) Prior Publication Data

US 2015/0304089 A1 Oct. 22, 2015

Related U.S. Application Data

(63) Continuation of application No. 11/687,645, filed on Mar. 17, 2007, now Pat. No. 9,130,791.

(Continued)

(51) Int. Cl.
*H04L 1/00* (2006.01)
*H04L 5/00* (2006.01)
(Continued)

(52) U.S. Cl.
CPC ......... *H04L 5/0057* (2013.01); *H04B 7/0413* (2013.01); *H04B 7/0632* (2013.01);
(Continued)

(58) Field of Classification Search
CPC .................................................. H04B 17/0082
(Continued)

(56) References Cited

U.S. PATENT DOCUMENTS 6,005,876 A 12/1999 Cimini, Jr. et al.
6,208,669 B1 3/2001 Cimini, Jr. et al.
(Continued)

FOREIGN PATENT DOCUMENTS

CN 1481175 A 3/2004
EP 0752779 A2 1/1997
(Continued)

OTHER PUBLICATIONS

3GPP: "3rd Generation Partnership Project, Technical Specification Group Radio Access Network, Physical Layer Aspects for Evolved UTRA", 3GPP TR 25.814, V1.1.1, 3GPP, Feb. 28, 2006, pp. 53-57.
(Continued)

*Primary Examiner* — Wen Huang
(74) *Attorney, Agent, or Firm* — Peng Zhu

(57) ABSTRACT

Techniques for efficiently deriving uplink channel estimates without consuming much additional uplink resources are described. A user equipment (UE) may send a request for uplink resources on a request channel (REQCH) whenever the UE desires to transmit data on the uplink. The UE may send the REQCH on a set of subcarriers and from multiple antennas, e.g., send REQCH data on data subcarriers and pilot on pilot subcarriers. A Node B may receive the request, estimate the complex channel gains for the pilot subcarriers based on received pilot symbols, and coherently demodulate received data symbols based on the channel gain estimates. The Node B may estimate the complex channel gains for the data subcarriers based on demodulated data symbols and derive a channel estimate for each UE antenna based on the channel gain estimates for the pilot and data subcarriers. The Node B may use the channel estimates for MIMO scheduling, subband scheduling, and rate selection.

35 Claims, 11 Drawing Sheets

Related U.S. Application Data

(60) Provisional application No. 60/784,583, filed on Mar. 20, 2006, provisional application No. 60/786,445, filed on Mar. 27, 2006.

(51) Int. Cl.
*H04L 25/02* (2006.01)
*H04L 27/26* (2006.01)
*H04B 7/0413* (2017.01)
*H04B 7/06* (2006.01)
*H04W 52/32* (2009.01)
*H04W 72/04* (2009.01)
*H04L 1/02* (2006.01)
*H04L 1/06* (2006.01)
*H04L 5/02* (2006.01)

(52) U.S. Cl.
CPC ........ *H04L 25/023* (2013.01); *H04L 25/0224* (2013.01); *H04L 27/261* (2013.01); *H04W 52/325* (2013.01); *H04W 72/042* (2013.01); *H04B 2201/70701* (2013.01); *H04L 1/0002* (2013.01); *H04L 1/02* (2013.01); *H04L 1/06* (2013.01); *H04L 5/023* (2013.01)

(58) Field of Classification Search
USPC ....... 455/45, 59, 61; 375/220, 219; 370/329, 370/330
See application file for complete search history.

(56) References Cited

U.S. PATENT DOCUMENTS

| | | |
|---|---|---|
| 6,473,467 B1 | 10/2002 | Wallace et al. |
| 7,054,633 B2 | 5/2006 | Seo et al. |
| 7,194,042 B2 | 3/2007 | Walton et al. |
| 7,209,712 B2 | 4/2007 | Holtzman |
| 7,236,748 B2 | 6/2007 | Li et al. |
| 7,269,127 B2 | 9/2007 | Mody et al. |
| 7,321,563 B2 | 1/2008 | Kim et al. |
| 7,343,172 B2 | 3/2008 | Hwang |
| 7,450,532 B2 | 11/2008 | Chae et al. |
| 7,701,917 B2 | 4/2010 | Mantravadi et al. |
| 7,830,976 B2 | 11/2010 | Gorokhov et al. |
| 7,873,000 B2 | 1/2011 | Cheng et al. |
| 8,014,455 B2 | 9/2011 | Kim et al. |
| 8,208,364 B2 | 6/2012 | Walton et al. |
| 8,218,609 B2 | 7/2012 | Walton et al. |
| 8,503,555 B2 | 8/2013 | Kim et al. |
| 2002/0111142 A1 | 8/2002 | Klimovitch |
| 2003/0128658 A1 | 7/2003 | Walton et al. |
| 2004/0001429 A1 | 1/2004 | Ma et al. |
| 2004/0062221 A1 | 4/2004 | Gopalakrishnan et al. |
| 2004/0120411 A1 | 6/2004 | Walton et al. |
| 2004/0131038 A1 | 7/2004 | Kim et al. |
| 2004/0141466 A1 | 7/2004 | Kim et al. |
| 2004/0156328 A1 | 8/2004 | Walton et al. |
| 2004/0179627 A1 | 9/2004 | Ketchum et al. |
| 2004/0233838 A1 | 11/2004 | Sudo et al. |
| 2004/0253955 A1 | 12/2004 | Love et al. |
| 2005/0031044 A1 | 2/2005 | Gesbert et al. |
| 2005/0094598 A1 | 5/2005 | Medvedev et al. |
| 2005/0141540 A1 | 6/2005 | Li et al. |
| 2005/0170782 A1 | 8/2005 | Rong et al. |
| 2005/0286409 A1 | 12/2005 | Yoon et al. |
| 2005/0287978 A1 | 12/2005 | Maltsev et al. |
| 2005/0289256 A1 | 12/2005 | Cudak et al. |
| 2006/0029157 A1 | 2/2006 | Dabak et al. |
| 2006/0056451 A1 | 3/2006 | Yano et al. |
| 2006/0071807 A1 | 4/2006 | Sadowsky |
| 2006/0105813 A1 | 5/2006 | Nakao |
| 2006/0209980 A1 | 9/2006 | Kim et al. |
| 2006/0268623 A1 | 11/2006 | Chae et al. |
| 2007/0173275 A1 | 7/2007 | Das et al. |
| 2007/0189199 A1 | 8/2007 | Nishio |
| 2007/0218889 A1 | 9/2007 | Zhang et al. |
| 2007/0258366 A1 | 11/2007 | Imamura |
| 2007/0298728 A1 | 12/2007 | Imamura et al. |
| 2008/0032630 A1 | 2/2008 | Kim et al. |
| 2008/0069031 A1 | 3/2008 | Zhang et al. |
| 2008/0095223 A1 | 4/2008 | Tong et al. |
| 2008/0108310 A1 | 5/2008 | Tong et al. |
| 2009/0219838 A1 | 9/2009 | Jia et al. |

FOREIGN PATENT DOCUMENTS

| | | |
|---|---|---|
| EP | 1376895 A2 | 1/2004 |
| EP | 1786129 A1 | 5/2007 |
| JP | 10112694 A | 4/1998 |
| JP | H10503891 A | 4/1998 |
| JP | 2001352311 A | 12/2001 |
| JP | 2003304216 A | 10/2003 |
| JP | 2004166216 A | 6/2004 |
| JP | 2004222241 A | 8/2004 |
| JP | 2005039807 A | 2/2005 |
| JP | 2005057778 A | 3/2005 |
| JP | 2005525057 T | 8/2005 |
| JP | 2006067572 A | 3/2006 |
| JP | 2007537651 T | 12/2007 |
| WO | 9532558 A2 | 11/1995 |
| WO | 0176110 | 10/2001 |
| WO | 02093782 | 11/2002 |
| WO | 03096707 A2 | 11/2003 |
| WO | 2004028065 | 4/2004 |
| WO | 2004038984 A2 | 5/2004 |
| WO | 2004038986 A2 | 5/2004 |
| WO | 2004038988 A2 | 5/2004 |
| WO | 2005053186 A1 | 6/2005 |
| WO | 2005071864 | 8/2005 |
| WO | 2005079031 | 8/2005 |
| WO | 2005096522 A1 | 10/2005 |
| WO | 2005112323 | 11/2005 |
| WO | 2005119922 A2 | 12/2005 |
| WO | 2005125020 A1 | 12/2005 |
| WO | 2005125044 A1 | 12/2005 |
| WO | 2006010159 A1 | 1/2006 |
| WO | 2006059566 A1 | 6/2006 |

OTHER PUBLICATIONS

3GPP TR 25.814: "3rd Generation Partnership Project, Technical Specification Group Radio Access Network, Physical layer aspects for evolved Universal Terrestrial Radio Access (UTRA)", Release 7, 3GPP TR 25.814 W.1.0, vol. 25.814, No. V7.1.0, 1 Sep. 2006 (Sep. 1, 2006), pp. 1-133.
NEC, et al.,"Uplink Multiple Access for Evolved UTRA", TSG-RAN WG# 40bis Meeting R1-050287, Apr. 4, 2005, pp. 1-5.
QUALCOMM Europe: "UL PHY Channels—Overall Structure", 3GPP TSG-RAN WG1 LTE R1-060477, Feb. 13, 2006, pp. 1-6.
3GPP TR 25.814 V1.1.1 3rd Generation Partnership Project; Technical Specification Group Radio Access Network; Physical Layer Aspects for Evolved UTRA (Release 7), (Online) Feb. 28, 2006 (Feb. 28, 2006), XP002450131 Retrieved from the Internet: URL:http://www.3gpp.org/ftp/Specs/archive/25.814/25814-111.zip> (retrieved on Sep. 5, 2007) Sections 7.1.1.2;9.1.1;9.1.1.2.2;8.2.1.1.
International Search Report—PCT/US07/064426, International Search Authority—European Patent Office—Oct. 29, 2007.
Morelli M et al: "Estimation of channel statistics for interative detection of OFDM signals" Communications, 2004 IEEE International Conference on Paris, France Jun. 20-24, 2004, Piscataway, NJ, USA, IEEE, Jun. 20, 2004 (Jun. 20, 2004), pp. 847-851, XP010710061 ISBN: 0-7803-8533-0 sections III and IV.
Nortel, "Orthogonal Multi-User MIMO based Channel-Dependent Scheduling for SC-FDMA on E-UTRA Uplink", 3GPP TSG-RAN WG1#44, R1-060657 Feb. 13, 2006, pp. 1-3.
Nortel, "UL Virtual MIMO System Level Performance Evaluation for E-UTRA", 3GPP TSG-RAN1 WG1#43, R1-051422 Nov. 7, 2005, pp. 1-5.

(56) References Cited

OTHER PUBLICATIONS

NTT DoCoMo et al: "L1/L2 Control Channel Structure for E-UTRA Uplink [online]", 3GPP TSG-RAN WG1#44, R1-060320, Feb. 13, 2006.
Taiwan Search Report—TW096109651—TIPO—Jan. 27, 2011.
Viswanath, P. et al, "Opportunistic Beamforming Using Dumb Antennas" IEEE Transactions on Information Theory, IEEE USA, vol. 48, No. 6, Jun. 2002 (Jun. 2002), pp. 1277-1294, XP002314708 ISSN: 0018-9448 abstract right-hand column, paragraph 1.
Written Opinion—PCT/US2007/064426, International Search Authority, European Patent Office, Oct. 29, 2007.
AMC and HARQ Using Frequency Domain Channel-dependent Scheduling in MIMO Channel Transmission, NTT DoCoMo, NEC, SHARP, 3GPP TSG RAN WG1 #42 on LTE, London, UK, Aug. 29-Sep. 2, 2005, R1-050942.
Lee, "On closed-loop transmit beamforming with simple beam-control commands", 15th IEEE International Symposium onPersonal, Indoor and Mobile Radio Communications, 2004, PIMRC 2004, vol. 2, Sep. 5-8, 2004 pp. 1278-1282 vol. 2.
Rey, "Robust power allocation algorithms for MIMO OFDM systems with imperfect CSI", IEEE Transactions [see also Acoustics, Speech, and Signal Processing, IEEE Transactions on] Signal Processing, vol. 53, Issue 3, Mar. 2005, pp. 1070-1085.

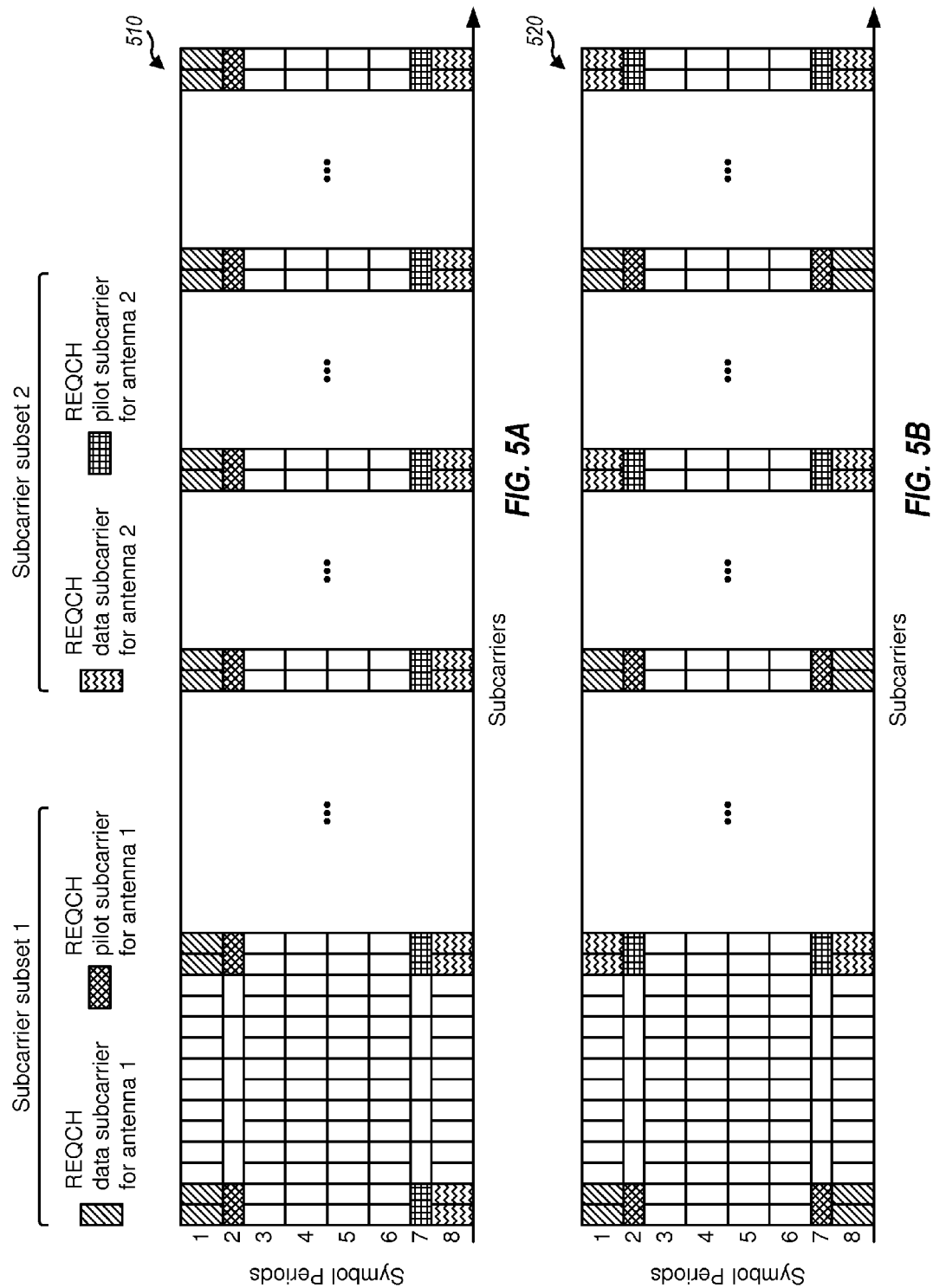

UPLINK CHANNEL ESTIMATION USING A SIGNALING CHANNEL

The present application is a continuation of application Ser. No. 11/687,645, filed Mar. 17, 2007, entitled "UPLINK CHANNEL ESTIMATION USING A SIGNALING CHANNEL," which claims the benefit of provisional Application Ser. No. 60/784,583, filed Mar. 20, 2006, entitled "A METHOD OF UPLINK MIMO CHANNEL ESTIMATION THROUGH BROADBAND REQUEST CHANNEL TRANSMITTED OVER MULTIPLE ANTENNAS" and provisional Application Ser. No. 60/786,445, filed Mar. 27, 2006, entitled "CHANNEL STATE FEEDBACK FOR DOWNLINK MIMO-OFDMA SUB-BAND SCHEDULING," all of which are assigned to the assignee hereof and incorporated herein by reference.

BACKGROUND

I. Field

The present disclosure relates generally to communication, and more specifically to techniques for performing channel estimation.

II. Background

A wireless multiple-access system may include Node Bs (or base stations) that communicate with user equipments (UEs). Each UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs.

The system may support multiple-input multiple-output (MIMO) transmission on the downlink and/or uplink. On the uplink, one or more UEs may send transmissions from multiple (T) transmit antennas to multiple (R) receive antennas at a Node B. A MIMO channel formed by the T transmit antennas and R receive antennas may be decomposed into C spatial channels, where $C \le \min\{T, R\}$. Improved performance (e.g., higher throughput and/or greater reliability) may be achieved by exploiting the spatial channels formed by the multiple transmit and receive antennas.

Any number of UEs may desire to transmit data on the uplink to a Node B at any given moment. Good performance may be achieved by selecting one or more "compatible" UEs whose transmissions will interference with one another as little as possible at the Node B. Compatibility may be determined by (i) estimating the channel response from each transmit antenna of each UE desiring to transmit data on the uplink to each receive antenna at the Node B and (ii) selecting a set of transmit antennas with channel responses that are most orthogonal to one another. The channel response for each transmit antenna may be estimated based on a pilot sent from that transmit antenna. Each UE desiring to transmit data on the uplink may be allocated radio resources to transmit pilot from each antenna at that UE. However, a large amount of uplink resources may be consumed for uplink pilots used for channel estimation to select compatible UEs for MIMO transmission on the uplink.

There is therefore a need in the art for techniques to efficiently estimate uplink channel responses for UEs without consuming excessive uplink resources.

SUMMARY

Techniques for efficiently deriving uplink channel estimates without consuming much additional uplink resources are described herein. In an aspect, a UE may send a request for uplink resources on a request channel (REQCH) whenever the UE desires to transmit data on the uplink. The UE may send the REQCH from multiple antennas either simultaneously or in a time-switched manner, e.g., from one antenna in each time interval. The UE may also send the REQCH on a set of subcarriers that may be distributed across one or more subbands or possibly entire system bandwidth. The UE may send REQCH data on data subcarriers and pilot on pilot subcarriers.

A Node B may receive the request sent on the REQCH by the UE and may estimate the complex channel gains for the pilot subcarriers based on received pilot symbols. The Node B may coherently demodulate received data symbols from the data subcarriers based on the channel gain estimates. The Node B may also estimate the complex channel gains for the data subcarriers based on demodulated data symbols, which should be reliable since the UE may be scheduled for uplink transmission only if the request from the UE can be correctly decoded by the Node B. The Node B may then derive a channel estimate for each antenna at the UE based on the channel gain estimates for the pilot and data subcarriers used for the REQCH. The Node B may use the channel estimates for the multiple antennas at the UE for various purposes such as selection of UEs for uplink MIMO transmission, subband scheduling, rate selection, etc.

Various aspects and features of the disclosure are described in further detail below.

BRIEF DESCRIPTION OF THE DRAWINGS

FIGS. 5A to 5C show three data and pilot patterns for the REQCH.

DETAILED DESCRIPTION

Figure 1:
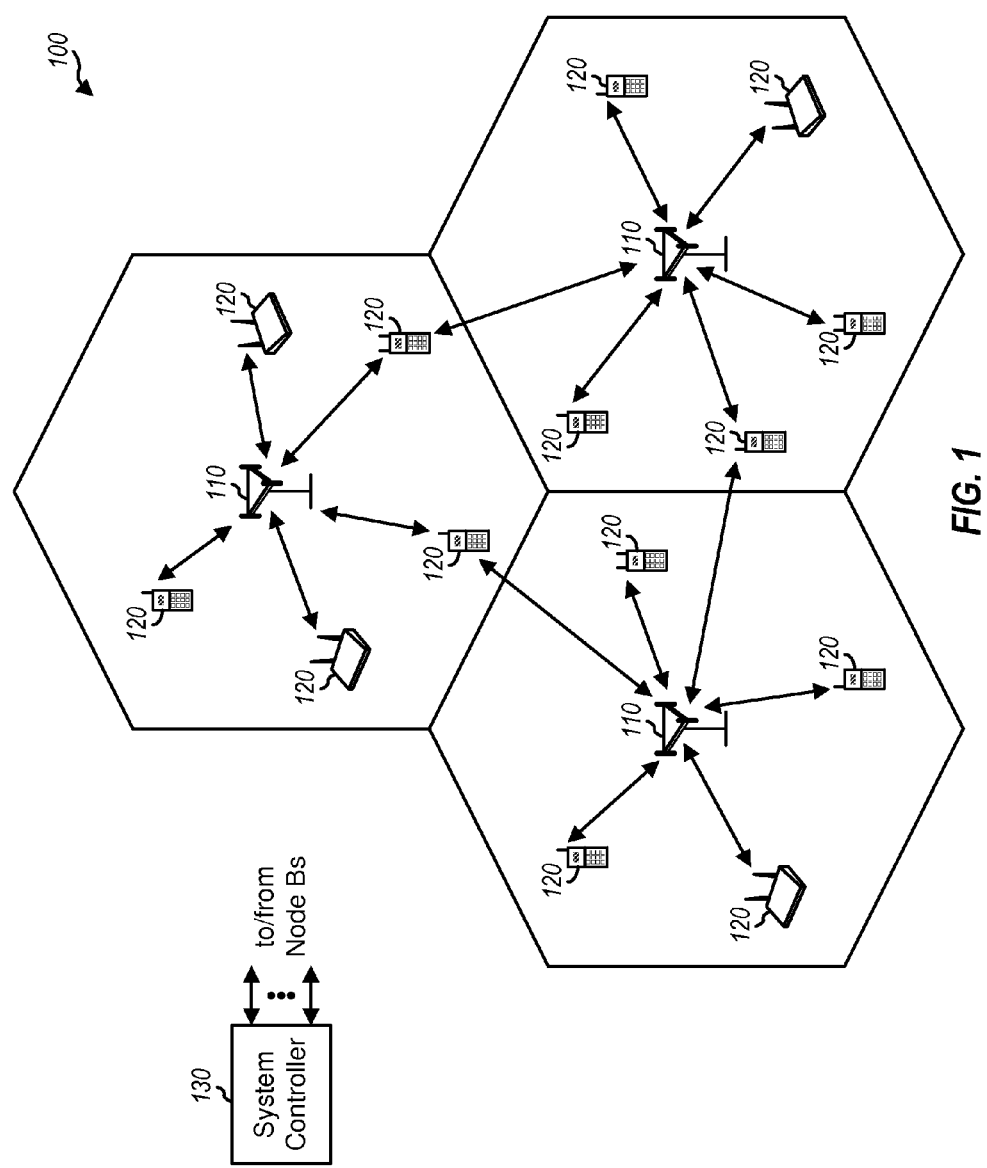
FIG. 1 shows a wireless communication system.

FIG. 1 shows a wireless communication system 100 with multiple Node Bs 110 and multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. A system controller 130 may couple to Node Bs 110 and provide coordination and control for these Node Bs. System controller 130 may be a single network entity or a collection of network entities, e.g., an Access Gateway (AGW), a Radio Network Controller (RNC), etc.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless communication device, a handheld device, a wireless modem, a laptop computer, etc.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system may implement a radio technology such as Universal Terrestrial Radio Access (UTRA), Evolved UTRA (E-UTRA), cdma2000, etc. UTRA includes Wideband CDMA (W-CDMA) and Time Division-Synchronous CDMA (TD-SCDMA). cdma2000 covers IS-2000, IS-95 and IS-856 standards. A TDMA system may implement a radio technology such as Global System for Mobile Communications (GSM). An OFDMA system may implement a radio technology such as Long Term Evolution (LTE) (which is part of E-UTRA), IEEE 802.20, IEEE 802.16, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent on subcarriers in the frequency domain with OFDM and in the time domain with SC-FDM. SC-FDM includes (i) localized FDM (LFDM) which transmits data on contiguous subcarriers, (ii) interleaved FDM (IFDM) which transmits data on subcarriers that are distributed across the system bandwidth, (iii) enhanced FDM (EFDM) which transmits data on multiple groups of contiguous subcarriers, and (iv) other variants of SC-FDM.

Figure 2A:
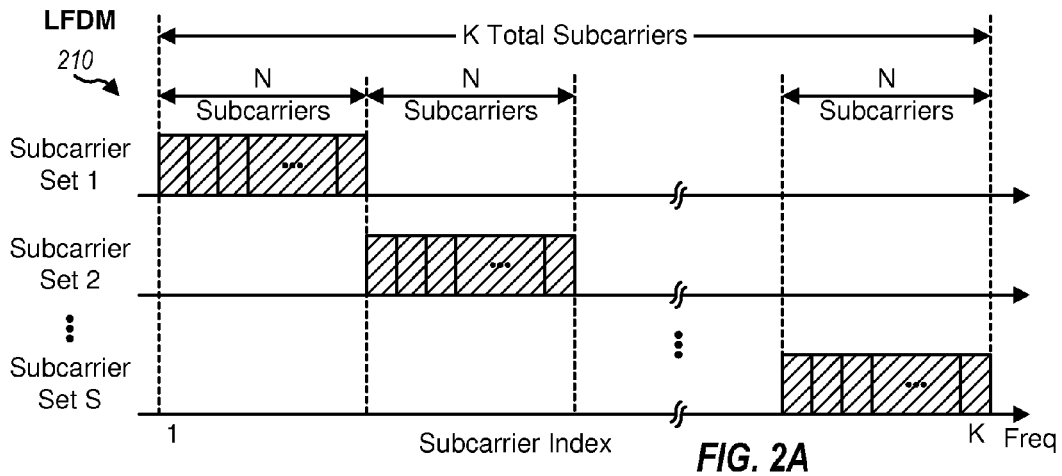
FIGS. 2A to 2C show subcarrier structures for LFDM, IFDM, and EFDM.

FIG. 2A shows a subcarrier structure 210 for LFDM. The overall system bandwidth of BW MHz is partitioned into multiple (K) orthogonal subcarriers that are given indices of 1 through K, where K may be any integer value. The spacing between adjacent subcarriers is BW/K MHz. A subset of the K total subcarriers may be usable for transmission. The remaining subcarriers, which are typically located at the two band edges, may serve as guard subcarriers to allow the system to meet spectral mask requirements. For simplicity, the following description assumes that all K total subcarriers are usable for transmission. For subcarrier structure 210, the K total subcarriers are arranged into S non-overlapping sets, with each set containing N contiguous subcarriers, where S>1, N>1 and K=S·N.

Figure 2B:
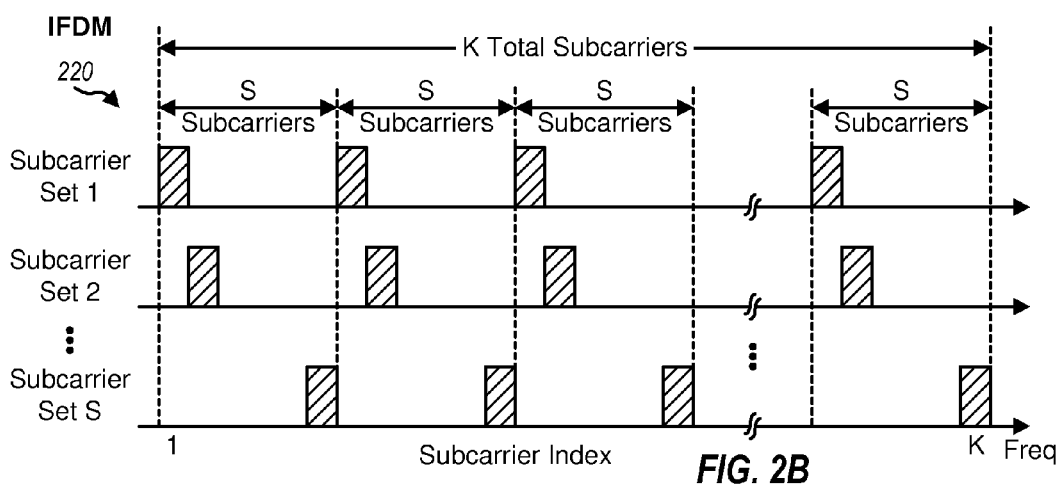

FIG. 2B shows a subcarrier structure 220 for IFDM. For subcarrier structure 220, the K total subcarriers are arranged into S non-overlapping sets, with each set containing N subcarriers that are uniformly distributed across the K total subcarriers, where K=S·N. Consecutive subcarriers in each set are spaced apart by S subcarriers.

Figure 2C:
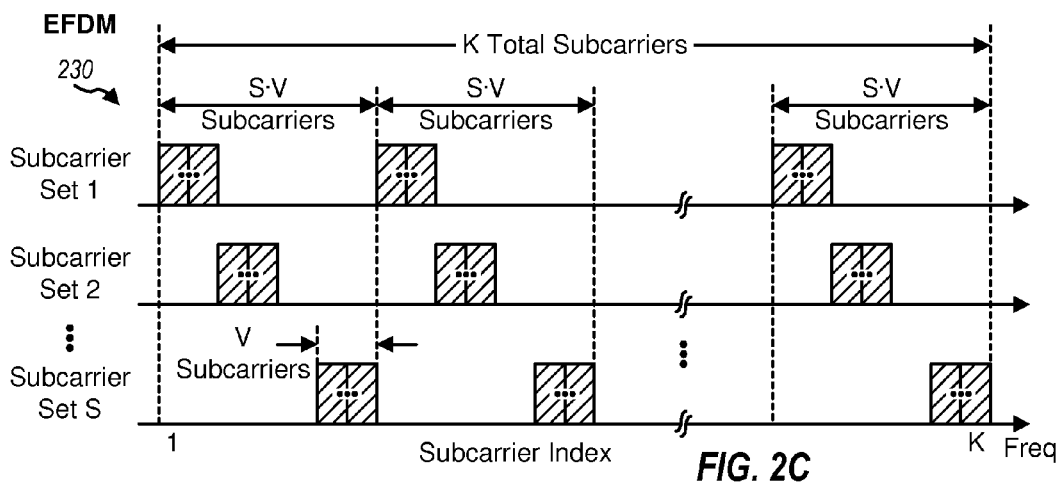

FIG. 2C shows a subcarrier structure 230 for EFDM. For subcarrier structure 230, the K total subcarriers are arranged into S non-overlapping sets, with each set containing G groups of subcarriers that are distributed across the K total subcarriers. For each set, the G groups are spaced apart by S·V subcarriers, and each group contains V consecutive subcarriers, where N=G·V.

In general, a subcarrier structure may include any number of non-overlapping subcarrier sets. Each subcarrier set may contain any number of subcarriers and any one of the K total subcarriers. The subcarrier sets may contain the same or different numbers of subcarriers. For each set, the subcarriers in the set may be adjacent to one another as shown in FIG. 2A, uniformly distributed across the system bandwidth as shown in FIG. 2B, arranged in multiple groups that may be distributed across the system bandwidth as shown in FIG. 2C, or arranged in other manners. Each subcarrier set may be assigned to one or more UEs. The subcarrier structures in FIGS. 2A to 2C may also be used for OFDM.

The K total subcarriers may also be divided into multiple subbands. Each subband may include Q consecutive subcarriers, where Q may be any integer value. In one design, Q is an integer multiple of N, and each subband includes multiple sets of consecutive subcarriers. A subband may also correspond to a particular bandwidth, e.g., one MHz of bandwidth.

Figure 3A:
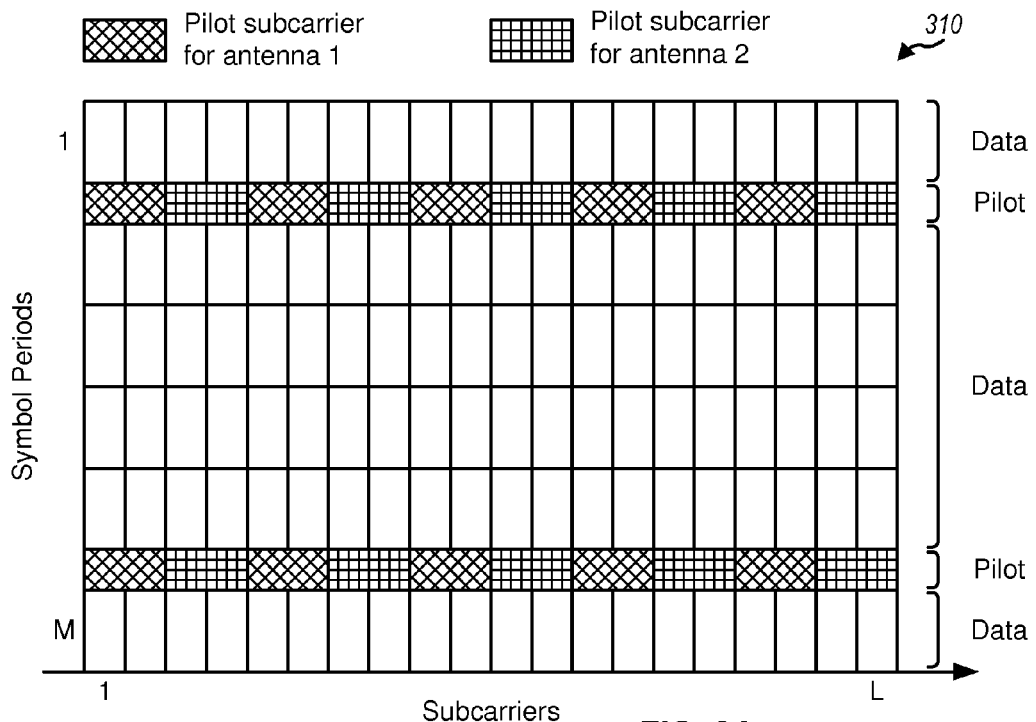
FIGS. 3A and 3B show two data and pilot structures.

FIG. 3A shows a design of a data and pilot structure 310 that may be used for OFDM and SC-FDM. In this design, a time frequency block covers a set of L subcarriers in a slot of M symbol periods. A slot may also be referred to as a transmission time interval (TTI), etc. The L subcarriers may be adjacent to one another for LFDM, distributed across the K total subcarriers for IFDM, or distributed in groups for EFDM. In the example shown in FIG. 3A, the time frequency block covers L=20 subcarriers in M=8 symbol periods, with six symbol periods being used for data and two symbol periods being used for pilot. In general, the M symbol periods may have equal or different durations. In the design shown in FIG. 3A, data is sent in a long symbol period, and pilot is sent in a short symbol period that is half the duration of a long symbol period. In this design, there are L subcarriers in each long symbol period but only L/2 subcarriers in each short symbol period. A subcarrier used to send data is referred to as a data subcarrier, and a subcarrier used to send pilot is referred to as a pilot subcarrier.

As shown in FIG. 3A, different antennas may be assigned different pilot subcarriers. Pilots may be transmitted simultaneously from these antennas using frequency division multiplexing (FDM).

Figure 3B:
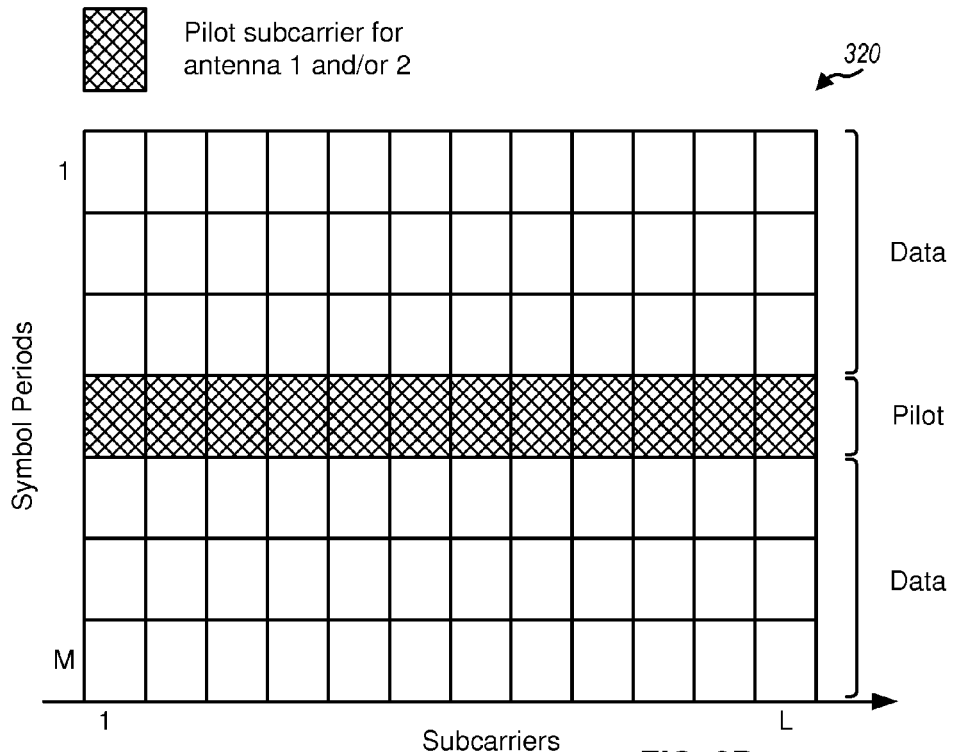

FIG. 3B shows a design of a data and pilot structure 320 that may also be used for OFDM and SC-FDM. In this design, a time frequency block covers a set of L subcarriers in a slot of M symbol periods of equal duration. In the example shown in FIG. 3B, the time frequency block covers L=12 subcarriers in M=7 symbol periods, with six symbol periods being used for data and one symbol period being used for pilot. Pilots may be transmitted simultaneously from one or more antennas on the same pilot subcarriers using code division multiplexing (CDM). For example, different antennas may be assigned different orthogonal sequences, e.g., different Chu sequences.

FIGS. 3A and 3B show two examples of partitioning time frequency resources into blocks. Other structures may also be used to send data and pilot. The transmission timeline may also be partitioned into subframes. Each subframe may include a predetermined number of slots, e.g., two slots. The transmission timeline may also be partitioned into other time units.

A Node B may support single-user MIMO (SU-MIMO) and/or multi-user MIMO (MU-MIMO). On the uplink, SU-MIMO refers to MIMO transmission from a single UE on a given time frequency block. MU-MIMO refers to MIMO transmission from multiple UEs on the same time frequency block. MU-MIMO is also referred to as Spatial Division Multiple Access (SDMA). SU-MIMO may be used for some time frequency blocks, and MU-MIMO may be used for other time frequency blocks. The Node B may also support space-time transmit diversity (STTD), space-frequency transmit diversity (SFTD), and/or other transmission schemes. These various transmit diversity schemes may be considered as special modes of MIMO.

A given time frequency block may be assigned to one or more UEs. A single UE may send multiple data symbols on a given data subcarrier via multiple transmit antennas at the UE. Multiple UEs may also send multiple data symbols on the same data subcarrier via different transmit antennas at these UEs.

FIG. 3A shows an example assignment of data and pilot subcarriers in one time frequency block to two UEs for MU-MIMO. In this example, the two UEs may share the L data subcarriers in each long symbol period. Each UE may be assigned half of the pilot subcarriers in each short symbol period. The L/4 pilot subcarriers assigned to each UE in one short symbol period may be distributed across the time frequency block, as shown in FIG. 3A. Each UE may be assigned the same pilot subcarriers (as shown in FIG. 3A) or different pilot subcarriers (not shown in FIG. 3A) in the two short symbol periods. The time frequency block may also be assigned to a single UE with two transmit antennas for SU-MIMO. In this case, each antenna may be assigned half of the pilot subcarriers in each short symbol period.

In general, a time frequency block may be assigned to any number of UEs for MU-MIMO or to a single UE with any number of transmit antennas for SU-MIMO. For MU-MIMO, different UEs may share the same data subcarriers but may be assigned different pilot subcarriers (e.g., as shown in FIG. 3A) or may share the same pilot subcarriers (e.g., as shown in FIG. 3B). For SU-MIMO, different transmit antennas at a single UE may share the same data subcarriers but may be assigned different pilot subcarriers (e.g., as shown in FIG. 3A) or may share the same pilot subcarriers (e.g., as shown in FIG. 3B). For both SU-MIMO and MU-MIMO, the Node B may derive a channel estimate for each UE antenna across frequency and possibly time based on the pilot subcarriers assigned to that UE antenna. For simplicity, much of the description below assumes UEs with two antennas.

Figure 4:
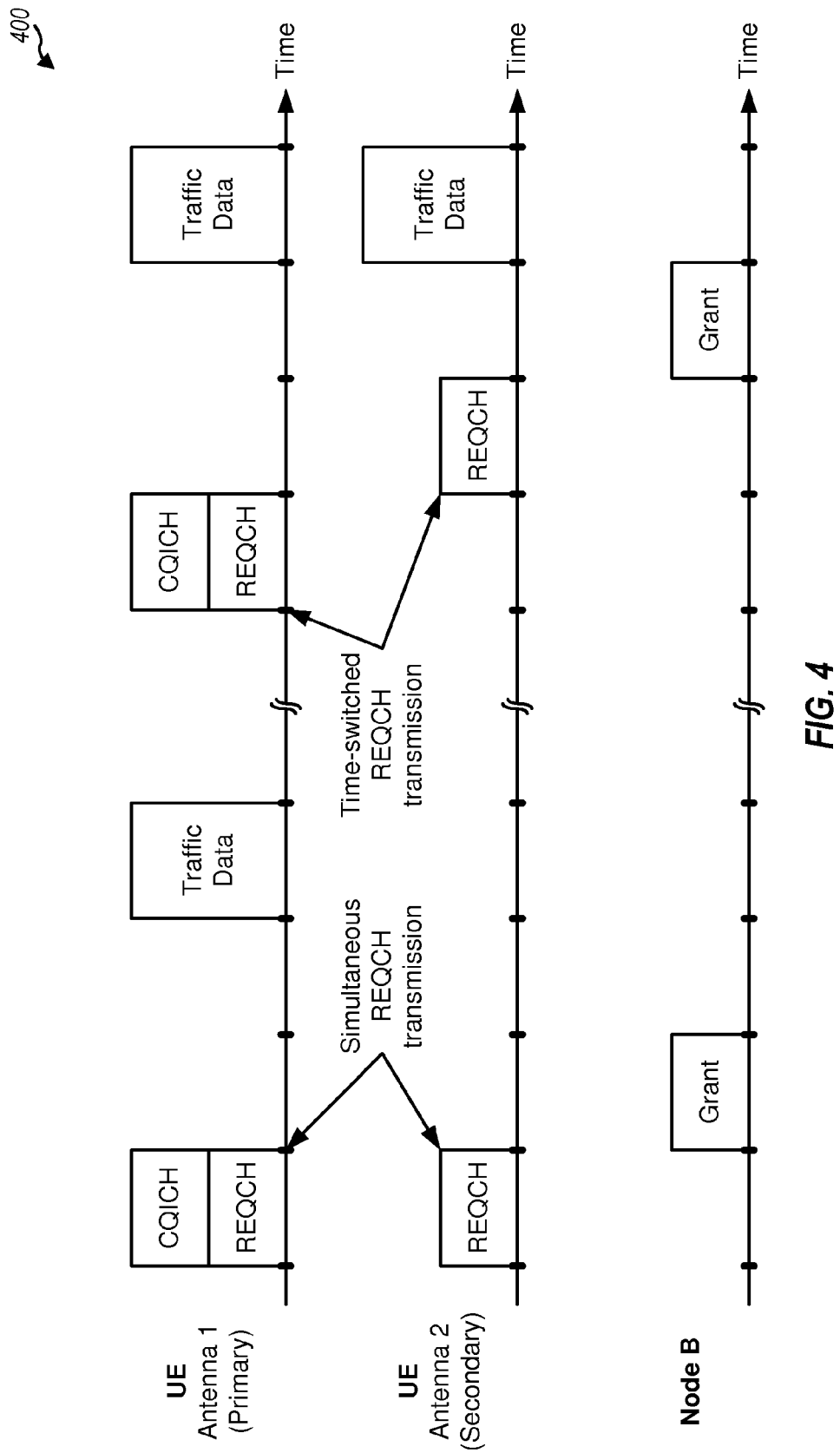
FIG. 4 shows uplink transmission of signaling and data via two antennas.

FIG. 4 shows a design of an uplink transmission scheme 400 for a UE with two transmit antennas 1 and 2. Transmit antenna 1 may be designated as a primary antenna, and transmit antenna 2 may be designated as a secondary antenna. In this design, the UE may periodically estimate the downlink channel quality for the Node B, determine channel quality indicator (CQI) for the downlink, and send the CQI on a CQI channel (CQICH) to the Node B. For example, the UE may send a CQI report every 20 subframes.

The UE may also send a request for uplink resources on a request channel (REQCH) to the Node B whenever the UE desires to transmit data on the uplink. In general, a request channel may be any channel used to send request for resources for transmission. The request may include any information such as the number of antennas at the UE, data queue size for the UE, the amount of resources being requested, etc. The Node B may receive the request from the UE, assign uplink resources (e.g., one or more time frequency blocks) to the UE, and send a grant of the assigned uplink resources on a shared downlink control channel (SDCCH) to the UE. The UE may then transmit data on the assigned uplink resources.

In one design, the UE may transmit the CQICH periodically via the primary antenna. The Node B may perform power control of the link for the primary antenna based on the CQICH and may adjust the transmit power of the primary antenna to a desired level, e.g., to achieve a target received signal-to-noise ratio (SNR). The Node B may also use the CQIs received on the CQICH to select suitable data rates for downlink transmission to the UE.

The UE may transmit the REQCH via one or more antennas in various manners. The UE may transmit the REQCH from multiple antennas simultaneously, e.g., as shown in FIG. 4. The UE may also transmit the REQCH from multiple antennas in a time-switched manner, e.g., from one antenna in one time interval, then from another antenna in another time interval, etc., as also shown in FIG. 4. In general, a time interval may correspond to a symbol period, a slot, a subframe, etc. The UE may also transmit the REQCH from multiple antennas in other manners, e.g., from the primary antenna more often than the secondary antenna. The UE may transmit the REQCH on a particular subband, few subbands, or across the entire system bandwidth. The transmission on the REQCH may provide the Node B with a delta power spectral density (PSD) between the REQCH and the CQICH. The REQCH and CQICH may be transmitted in the same time intervals (e.g., as shown in FIG. 4) and/on in different time intervals (not shown in FIG. 4). For example, the CQICH may be transmitted at regular intervals whereas the REQCH may be transmitted whenever the UE desires to send data on the uplink.

A UE may have a single power amplifier (PA) that may be coupled to one of multiple antennas at the UE. This single-PA UE may be able to transmit from only one antenna at any given moment. A UE may also have multiple PAs for multiple antennas, e.g., one PA per antenna. This multi-PA UE may be able to transmit from multiple antennas at the same time.

FIG. 5A shows a design of a data and pilot pattern 510 for transmitting the REQCH from multiple antennas in a time-switched manner by a UE with a single PA or multiple PAs. Pattern 510 is based on the data and pilot subcarriers described in FIG. 3A. The UE may transmit the REQCH on a set of data and pilot subcarriers. These data and pilot subcarriers may be distributed across the system bandwidth (or the K total subcarriers) to achieve frequency diversity for the REQCH and to allow the Node B to estimate the channel response across the entire system bandwidth. Alternatively, the data and pilot subcarriers may be distributed across a portion of the system bandwidth, e.g., one or few subbands.

In the design shown in FIG. 5A, the UE may transmit REQCH data on data subcarriers from antenna 1 in symbol period 1, REQCH pilot on pilot subcarriers from antenna 1 in symbol period 2, REQCH pilot on pilot subcarriers from antenna 2 in symbol period 7, and REQCH data on data subcarriers from antenna 2 in symbol period 8. The UE may thus transmit either REQCH data or pilot from a single antenna in any given symbol period.

FIG. 5B shows a design of a data and pilot pattern 520 for transmitting the REQCH from multiple antennas simultaneously by a UE with multiple PAs. Pattern 520 is also based on the data and pilot subcarriers described in FIG. 3A. The UE may transmit the REQCH on a set of data and pilot subcarriers that may be distributed across all or part of the system bandwidth. This set of data and pilot subcarriers may be divided into two subsets. The first subset may contain half of the data and pilot subcarriers in the set, and the second subset may contain the other half of the data and pilot subcarriers in the set. In the design shown in FIG. 5B, the UE may transmit REQCH data and pilot on the first subset of subcarriers from antenna 1 and on the second subset of subcarriers from antenna 2 in symbol periods 1 and 2. The UE may transmit REQCH data and pilot on the first subset of subcarriers from antenna 1 and on the second subset of subcarriers from antenna 2 in symbol periods 7 and 8. The UE may transmit either REQCH data or pilot from both antennas in any given symbol period.

Figure 5C:
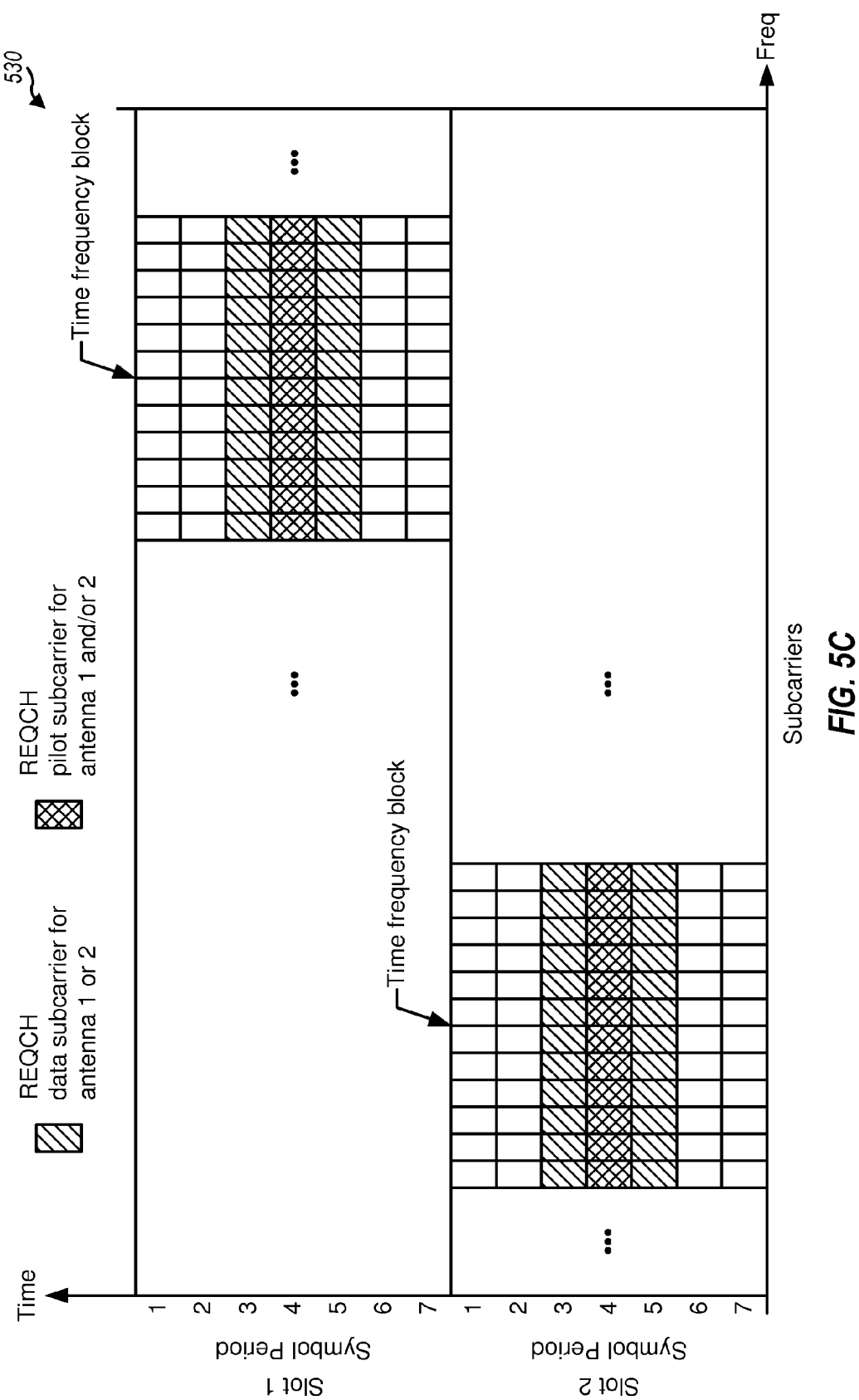

FIG. 5C shows a design of a data and pilot pattern 530 for transmitting the REQCH from multiple antennas simultaneously by a UE with multiple PAs. Pattern 530 is based on the data and pilot subcarriers described in FIG. 3B. The UE may transmit the REQCH on one or more time frequency blocks in one or more slots. For example, the UE may transmit the REQCH on two time frequency blocks in two slots of a subframe, with the two time frequency blocks being located in different parts of the system bandwidth. In general, the UE may transmit the REQCH on any number of time frequency blocks, which may hop across frequency in any manner. In each time frequency block, the UE may transmit REQCH pilot on the pilot subcarriers and may transmit REQCH data on two data subcarriers on both sides of each pilot subcarrier.

FIGS. 5A to 5C show three example data and pilot patterns for transmitting the REQCH from two antennas. The REQCH may also be transmitted in other manners, based on other data and pilot patterns, and/or from different numbers of antennas. Furthermore, only data may be sent on the REQCH, or both data and pilot may be sent on the REQCH.

In general, the number of data subcarriers to use for the REQCH may be dependent on the amount of information in a request sent on the REQCH. The pilot subcarriers may be used to provide a reference, which may be used for coherent demodulation of the data subcarriers. The data and pilot subcarriers may be arranged in clusters, with each cluster including one or more data subcarriers and one or more pilot subcarriers. In the designs shown in FIGS. 5A to 5C, each cluster includes two data subcarriers and one pilot subcarrier. REQCH data and pilot may be sent from the same transmit antenna in each cluster. A channel gain estimate may be derived from the pilot subcarrier in each cluster and used for coherent demodulation of the data subcarriers in that cluster.

A UE may transmit the REQCH on time frequency resources that may be shared with other UEs, e.g., in similar manner as a random access channel. The REQCH transmission from the UE may then collide with REQCH transmissions from other UEs. The UE may select different time frequency resources for different REQCH transmissions in order to avoid perpetual collisions with other UEs. The system may also allocate a sufficient amount of shared resources for the REQCH in order to achieve an acceptable rate of collisions for the REQCH transmissions.

A UE may be assigned dedicated time frequency resources for transmitting the REQCH and may then be able to avoid collisions with other UEs. The UE may send a designated codeword on the CQICH to indicate that the UE desires to transmit the REQCH. The Node B may then assign dedicated resources to the UE upon receiving this codeword on the CQICH from the UE. Different UEs may be assigned different time frequency resources for transmitting the REQCH. Each UE may transmit its request on its assigned time frequency resources whenever that UE desires to transmit data on the uplink. Any number of UEs may transmit requests on the REQCHs at any given moment.

The Node B may receive the REQCH from each UE and may estimate the complex channel gains of the pilot subcarriers for that UE based on the received pilot symbols. The Node B may then coherently demodulate the data subcarriers for each UE based on the channel gain estimates derived from the pilot subcarriers for that UE. The Node B may also estimate the complex channel gains of the data subcarriers for each UE based on the demodulated data symbols. Since a UE may be scheduled for uplink transmission only if the request from the UE can be correctly decoded by the Node B, the decoded request from the UE may be used to reconstruct the data symbols sent by the UE for the request. The reconstructed data symbols would be reliable and may be used as additional pilot symbols for channel estimation. The Node B may derive a channel estimate for each antenna at each UE based on the channel gain estimates for the pilot and data subcarriers used for the REQCH by that UE. A MIMO channel estimate for each UE may comprise channel estimates for all antennas at that UE.

The Node B may use the REQCH for one or more of the following:
  UE selection for SU-MIMO and MU-MIMO—select a single UE for SU-MIMO operation or multiple UEs for MU-MIMO operation on the same time frequency resources, e.g., a time frequency block,
  Subband scheduling—select a subband for a UE,
  Rate selection—select one or more rates for each scheduled UE, and
  Power control and reference power level adjustment—adjust transmit power of each UE.

The REQCH may be used for UE selection for MIMO transmission. The MIMO channel response for each UE may be estimated based on the REQCH sent by that UE. The MIMO channel estimates for different UEs may be evaluated to select compatible UEs for MIMO transmission on the uplink. For example, two UEs may be selected for MU-MIMO operation on a given time frequency block as follows. Different pairs of antennas for different UEs may be identified. The channel estimates for each antenna pair may be evaluated to determine the rank and the achievable data rates for the MIMO channel formed with that antenna pair. The rank and data rates may be dependent on the amount of orthogonality between the channel estimates for the pair of antennas. The pair of antennas with channel estimates that are most orthogonal may be selected, and the UEs with these antennas may be scheduled for uplink transmission on the same time frequency block. The MIMO channel estimates for the UEs may also be used for antenna selection for SU-MIMO and for transmit diversity schemes in addition to MU-MIMO. In general, a given UE may be scheduled for uplink transmission on only the primary antenna, or only the secondary antenna, or both antennas. A given time frequency block may also be assigned to a single UE for SU-MIMO if this single UE can achieve better performance than all antenna pairs evaluated for MU-MIMO.

The REQCH may be used for subband scheduling. Wideband channel estimates may be derived for each UE if the data and pilot subcarriers used for the REQCH are distributed across the system bandwidth. The wideband channel estimates for each UE may be used for subband scheduling to select a suitable subband for that UE. The channel estimates for a given UE may vary widely across the system bandwidth due to frequency selective fading, which may result from multipath in the wireless environment. The UE may be scheduled for uplink transmission on a subband with high channel gains and/or high received SNR.

The REQCH may be used for rate selection. The Node B may estimate the received SNR of each antenna at each UE scheduled for uplink transmission. The SNR may be estimated based on received pilot symbols from the REQCH, received data symbols from the REQCH, and/or received pilot symbols and received data symbols from other uplink transmissions. The Node B may select a data rate for each antenna at each scheduled UE based on the SNR estimate.

The REQCH may also be used for power control and reference power level adjustment. The transmit power of the CQICH may be adjusted via power control to achieve a target SNR. The REQCH may be sent with a fixed power relationship to the CQICH. The SNR of the REQCH may then be controlled via the power control for the CQICH and the fixed power relationship between the REQCH and CQICH.

The techniques described herein allow for derivation of uplink channel estimates for the UEs without consuming much (if any) additional resources. The UEs may send requests on the REQCH if and when these UEs desire to transmit data on the uplink. Resources for the REQCH are thus consumed only when needed. Furthermore, the UEs may send the REQCH from multiple antennas if MIMO operation is supported and desired by the UEs. The transmissions on the REQCH may be conveniently used as reference signals to derive channel estimates for the UEs. Since the REQCH is sent by the UEs in any case for uplink scheduling, little or no additional uplink overhead is inclined to "sound" the uplink MIMO channel and derive the channel estimates for these UEs. The use of the REQCH for sounding may be much more efficient than assigning dedicated resources to each UE for transmitting a broadband pilot. The REQCH may be used as a broadband pilot whenever a UE desires to transmit data on the uplink using MIMO.

Figure 6:
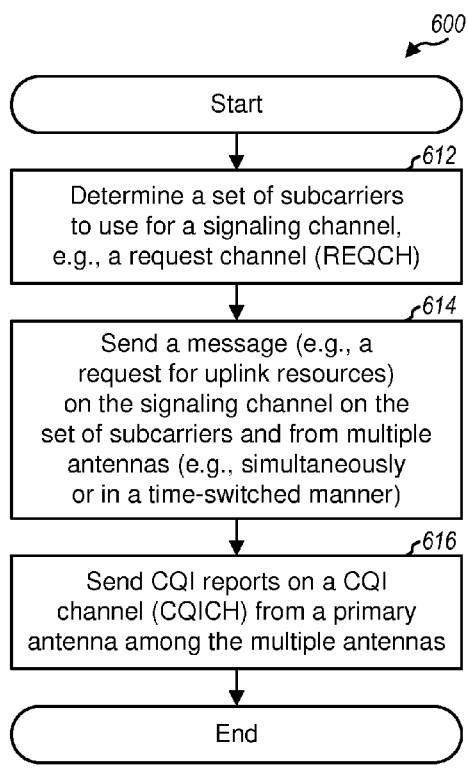
FIGS. 6 and 7 show a process and an apparatus, respectively, for a UE.

FIG. 6 shows a design of a process 600 performed by a UE. A set of subcarriers to use for a signaling channel may be determined (block 612). The set of subcarriers may be distributed across the system bandwidth or across multiple subbands to support wideband channel estimation. A message may be sent on the signaling channel on the set of subcarriers and from multiple antennas at the UE (block 614). The signaling channel may be a REQCH, and the message may be a request for uplink resources. The message may be sent from the multiple antennas either simultaneously or in a time-switched manner, from one antenna in each time interval.

The set of subcarriers for the signaling channel may include multiple data subcarriers and multiple pilot subcarriers. Message data may be sent on the multiple data subcarriers, e.g., in a first symbol period. Pilot may be sent on the multiple pilot subcarriers, e.g., in a second symbol period next to the first symbol period. The second symbol period may have the same or shorter duration than the first symbol period. Pilot may be sent on the pilot subcarriers and from the multiple antennas using FDM (e.g., as shown in FIGS. 5A and 5B) or using CDM (e.g., as shown in FIG. 5C).

The set of subcarriers for the signaling channel may be obtained in various manners. In one design, the set of subcarriers may comprise multiple subsets of subcarriers, one subset of subcarriers for each of antenna, e.g., as shown in FIG. 5B. The message may be sent from the multiple antennas on the multiple subsets of subcarriers in the same symbol period. The set of subcarriers may also comprise multiple clusters of subcarriers, with each cluster including at least one data subcarrier and at least one pilot subcarrier. Message data and pilot may be sent on each cluster of subcarriers from one antenna. In another design, the set of subcarriers may belong in multiple time frequency blocks, which may be distributed across the system bandwidth, e.g., as shown in FIG. 5C. The time frequency blocks may hop across the system bandwidth in different time intervals or slots.

CQI reports may be sent on a CQICH from a primary antenna among the multiple antennas (block 616). The transmit power of the CQICH may be adjusted via power control. The transmit power of the REQCH may be set at a predetermined offset from the transmit power of the CQICH.

Figure 7:
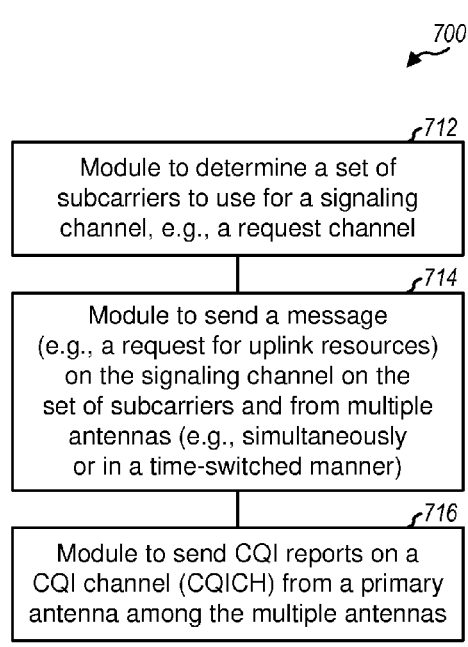

FIG. 7 shows a design of an apparatus 700 for a UE. Apparatus 700 includes means for determining a set of subcarriers to use for a signaling channel, e.g., a REQCH (module 712), means for sending a message (e.g., a request for uplink resources) on the signaling channel on the set of subcarriers and from multiple antennas at the UE (module 714), and means for sending CQI reports on a CQICH from a primary antenna among the multiple antennas (module 716). Modules 712 to 716 may comprise processors, electronics devices, hardware devices, electronics components, logical circuits, memories, etc., or any combination thereof.

Figures 8, 9:
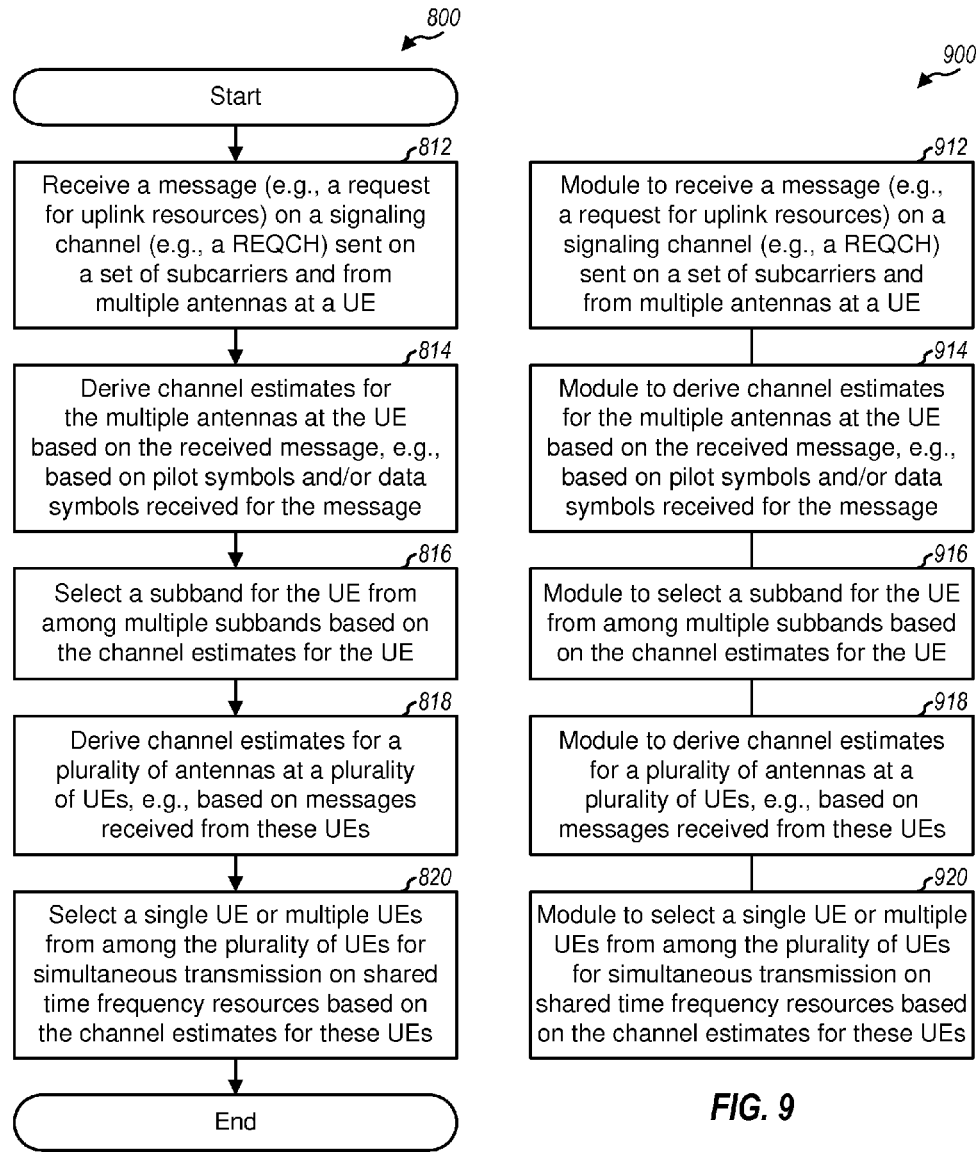
FIGS. 8 and 9 show a process and an apparatus, respectively, for a Node B.

FIG. 8 shows a design of a process 800 performed by a Node B. A message may be received on a signaling channel sent on a set of subcarriers and from multiple antennas at a UE (block 812). The signaling channel may be a REQCH, and the message may be a request for uplink resources. Channel estimates for the multiple antennas at the UE may be derived based on the received message, e.g., based on pilot symbols and/or data symbols received for the message (block 814).

The set of subcarriers for the signaling channel may comprise multiple data subcarriers and multiple pilot subcarriers. Coherent demodulation of the message may be performed by (i) deriving a first channel estimate based on received pilot symbols from the pilot subcarriers and (ii) demodulating the received data symbols from the data subcarriers based on the first channel estimate. Data symbols for the received message may be reconstructed. A second channel estimate may then be derived based on the reconstructed data symbols and the received data symbols. The channel estimates for the multiple antennas at the UE may be derived based on the first and second channel estimates obtained from the received pilot symbols and the received data symbols, respectively.

For subband scheduling, a subband may be selected for the UE from among multiple available subbands based on the channel estimates for the UE (block 816). Time frequency resources in the selected subband may be assigned to the UE for uplink transmission. SNR may also be estimated based on the received message. At least one rate for uplink transmission may be selected based on the estimated SNR.

For MIMO scheduling, channel estimates for a plurality of antennas at a plurality of UEs may be derived, e.g., based on messages received from these UEs (block 818). A single UE or multiple UEs may be selected from among the plurality of UEs for simultaneous transmission on shared time frequency resources based on the channel estimates for these UEs (block 820). A single UE may be selected for transmission via one or more antennas, e.g., using antenna selection. Multiple UEs may be selected for simultaneous transmission via different antennas at these UEs. The result of block 820 may be multiple antennas at multiple UEs, multiple antennas at one UE, only one antenna at one UE, etc. The best selection may be dependent on the MIMO channels for all antennas at all UEs. It is thus possible that one antenna at one UE may provide the best link throughput for given time frequency resources at a given time instant. The MIMO scheduling may also be performed for transmit diversity schemes. In this case, the channel estimates for both antennas at the UEs may be used for UE selection.

FIG. 9 shows a design of an apparatus 900 for a Node B. Apparatus 900 includes means for receiving a message (e.g., a request for uplink resources) on a signaling channel (e.g., a REQCH) sent on a set of subcarriers and from multiple antennas at a UE (module 912), means for deriving channel estimates for the multiple antennas at the UE based on the received message, e.g., based on pilot symbols and/or data symbols received for the message (module 914), means for selecting a subband for the UE from among multiple subbands based on the channel estimates for the UE (module 916), means for deriving channel estimates for a plurality of antennas at a plurality of UEs, e.g., based on messages received from these UEs (module 918), and means for selecting a single UE or multiple UEs from among the plurality of UEs for simultaneous transmission on shared time frequency resources based on the channel estimates for these UEs (module 920). Modules 912 to 920 may comprise processors, electronics devices, hardware devices, electronics components, logical circuits, memories, etc., or any combination thereof.

Figure 10:
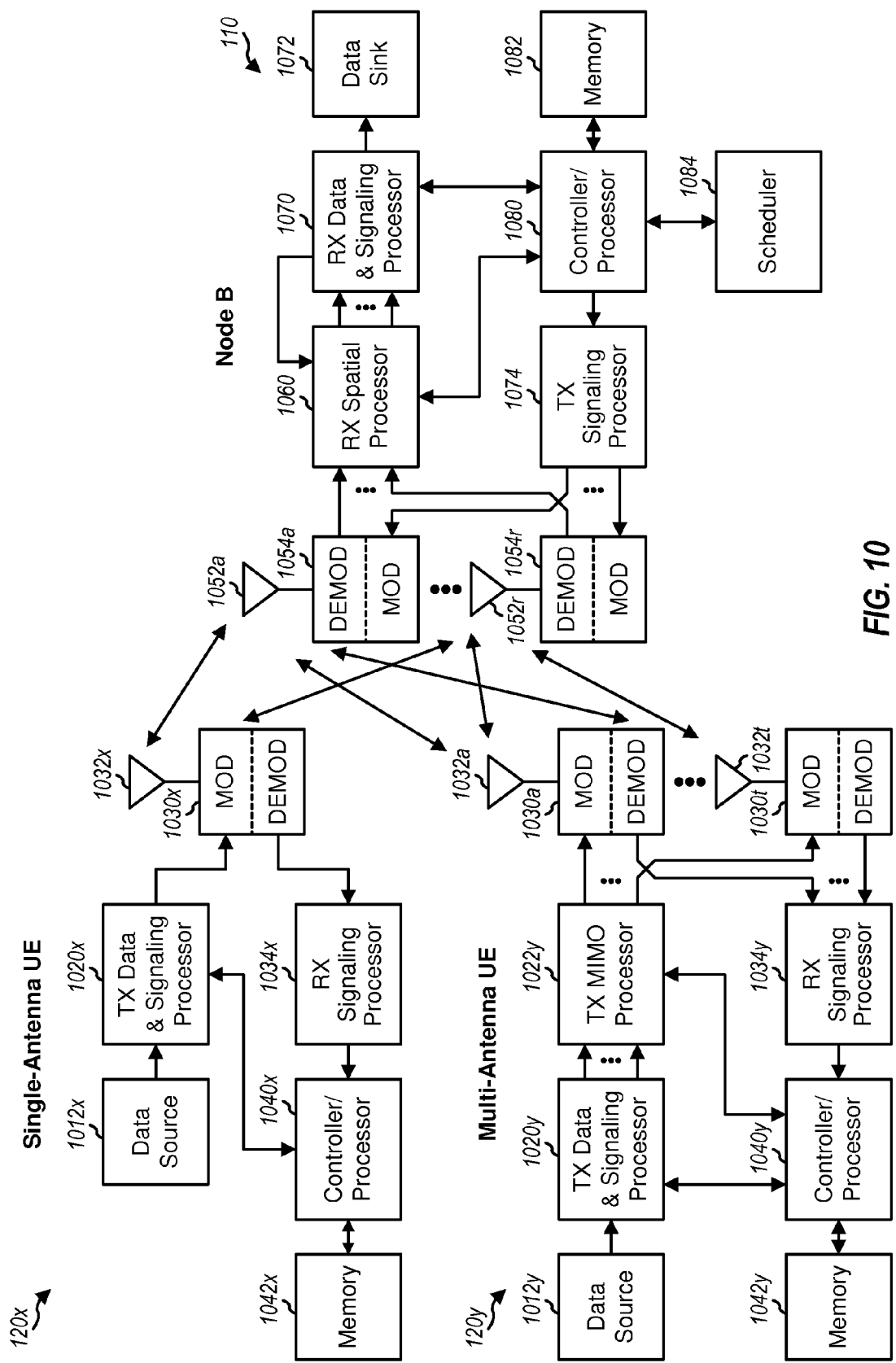
FIG. 10 shows a block diagram of a Node B and two UEs.

FIG. 10 shows a block diagram of a design of one Node B 110 and two UEs 120x and 120y in system 100. In FIG. 10, UE 120x is equipped with a single antenna 1032x, UE 120y is equipped with multiple (T) antennas 1032a through 1032t, and node B 110 is equipped with multiple (R) antennas 1052a through 1052r. Each antenna may be a physical antenna or an antenna may. For simplicity, FIG. 10 shows only processing units for data and signaling transmission on the uplink and signaling transmission on the downlink.

At each UE 120, a transmit (TX) data and signaling processor 1020 may receive traffic data from a data source 1012, process (e.g., format, encode, interleave, and symbol map) the traffic data, and generate data symbols for traffic. Processor 1020 may also receive signaling data (e.g., for the REQCH and CQICH) from a controller/processor 1040, process the signaling data, and generate data symbols for signaling. Processor 1020 may also generate and multiplex pilot symbols with the data symbols. As used herein, a data symbol is a symbol for traffic or signaling, a pilot symbol is a symbol for pilot, and a symbol is typically a complex value. The data symbols and pilot symbols may be modulation symbols from a modulation scheme such as PSK or QAM. Pilot is data that is known a priori by both the UEs and Node B.

At UE 120y, a TX MIMO processor 1022y may perform transmitter spatial processing (e.g., direct MIMO mapping, precoding, etc.) on the data and pilot symbols. A data symbol may be sent from one antenna for direct MIMO mapping or from multiple antennas for precoding. Processor 1022y may provide T output symbol streams to T modulators (MODs) 1030a through 1030t. At UE 120x, processor 1020x may provide a single output symbol stream to modulator 1030x. Each modulator 1030 may perform modulation (e.g., for SC-FDM, OFDM, etc.) on the output symbols to obtain output chips. Each modulator 1030 may further process (e.g., convert to analog, filter, amplify, and upconvert) its output chips and generate an uplink signal. At UE 120x, a single uplink signal from modulator 1030x may be transmitted from antenna 1032x. At UE 120y, T uplink signals from modulators 1030a through 1030t may be transmitted from T antennas 1032a through 1032t, respectively.

At Node B 110, R antennas 1052a through 1052r receive the uplink signals from UEs 120x and 120y and possibly other UEs. Each antenna 1052 provides a received signal to a respective demodulator (DEMOD) 1054. Each demodulator 1054 may process (e.g., filter, amplify, downconvert, and digitize) its received signal to obtain samples. Each demodulator 1054 may also perform demodulation (e.g., for SC-FDM, OFDM, etc.) on the samples to obtain received symbols. A receive (RX) spatial processor 1060 may estimate the channel responses for different UEs based on received pilot symbols, perform MIMO/SIMO detection on received data symbols, and provide data symbol estimates. An RX data and signaling processor 1070 may process (e.g., symbol demap, deinterleave, and decode) the data symbol estimates, provide decoded traffic data to a data sink 1072, and provide decoded signaling data to a controller/processor 1080.

Node B 110 may send traffic data and signaling data (e.g., grants of uplink resources, power control commands for the CQICH, etc.) to the UEs. The signaling data may be processed by a TX signaling processor 1074 and further processed by modulators 1054a through 1054r to generate R downlink signals, which may be sent via R antennas 1052a through 1052r. At each UE 120, the downlink signals from Node B 110 may be received by one or more antennas 1032, processed by one or more demodulators 1030, and further processed by an RX signaling processor 1034 to recover the signaling data sent by Node B 110.

Controllers/processors 1040x, 1040y, and 1080 may control the operation of various processing units at UEs 120x and 120y and Node B 110, respectively. Memories 1042x, 1042y, and 1082 may store data and program codes for UEs 120x and 120y and Node B 110, respectively. A scheduler 1084 may schedule UEs for transmission based on requests received from the UEs, channel estimates derived for the UEs, etc.

Figure 11:
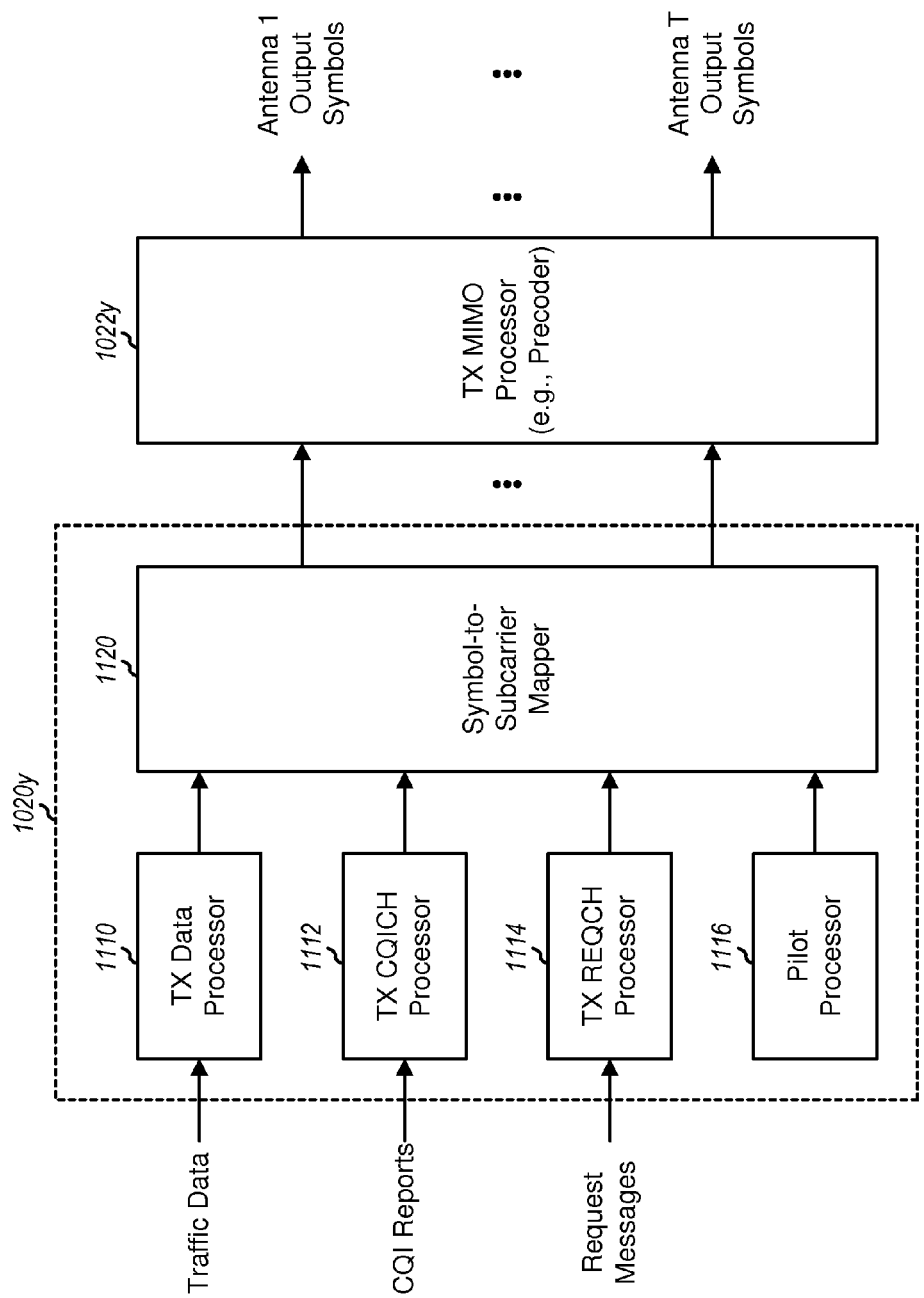
FIG. 11 shows a block diagram of a transmit (TX) data and signaling processor.

FIG. 11 shows a block diagram of a design of TX data and signaling processor 1020y at multi-antenna UE 120y in FIG. 10. Within processor 1020y, a TX data processor 1110 may process traffic data and provide data symbols for traffic data. A TX CQICH processor 1112 may process CQI reports and provide data symbols for the CQICH. A TX REQCH processor 1114 may process request messages and provide data symbols for the REQCH. A pilot processor 1116 may process pilot data and provide pilot symbols for traffic (e.g., as shown in FIG. 3A or 3B) and pilot symbols for the REQCH (e.g., as shown in FIG. 5A, 5B or 5C).

A symbol-to-subcarrier mapper 1120 may receive the data and pilot symbols from processors 1110 through 1116 and may map these symbols to the proper subcarriers on the proper antennas in the proper symbol periods. Mapper 1120 may map data symbols to data subcarriers, map pilot symbols to pilot subcarriers, provide the mapped data symbols to the proper antenna(s) in each data symbol period, and provide the mapped pilot symbols to the proper antenna(s) in each pilot symbol period. For example, mapper 1120 may map data and pilot symbols for the REQCH as shown in FIG. 5A, 5B or 5C. Mapper 1120 may provide one or more streams of mapped symbols in each symbol period, e.g., depending on the number of available PAs. For example, mapper 1120 may provide (i) one mapped symbol stream to different antennas in different symbol periods if one PA is available or (ii) multiple mapped symbol streams to multiple antennas if multiple PAs are available.

Figure 12:
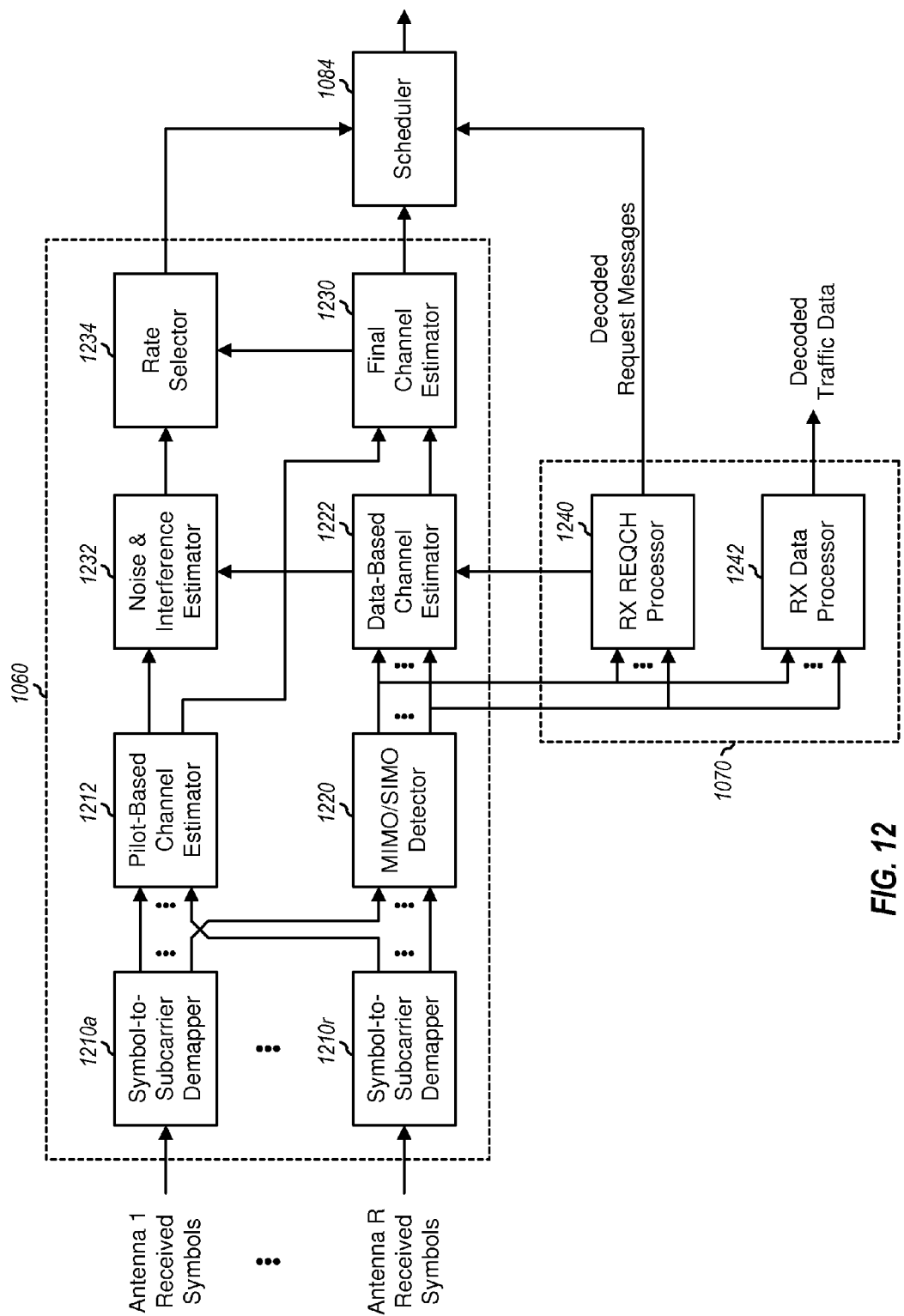
FIG. 12 shows a block diagram of a receive (RX) spatial processor and an RX data and signaling processor.

FIG. 12 shows a block diagram of a design of RX spatial processor 1060 and RX data and signaling processor 1070 at Node B 110 in FIG. 10. Within RX spatial processor 1060, received symbols from R demodulators 1054a through 1054r may be provided to R symbol-to-subcarrier demappers 1210a through 1210r, respectively. Each demapper 1210 may provide received pilot symbols from pilot subcarriers to a pilot-based channel estimator 1212 and provide received data symbols from data subcarriers to a MIMO/SIMO detector 1220. Channel estimator 1212 may derive channel gain estimates for the pilot subcarriers based on the received pilot symbols. The pilot subcarriers for the REQCH may be as shown in FIG. 5A, 5B or 5C. The pilot subcarriers for traffic data may be as shown in FIG. 3A or 3B. MIMO/SIMO detector 1220 may perform detection on the received data symbols with the channel gain estimates and provides data symbol estimates. For the REQCH, MIMO/SIMO detector 1220 may perform detection on the received data symbols in each cluster of subcarriers with a channel gain estimate for that cluster. For traffic data, MIMO/SIMO detector 1220 may perform MIMO/SIMO detection on the received data symbols from all R receive antennas based on minimum mean square error (MMSE), MMSE with successive interference cancellation (SIC), zero-forcing, or some other techniques.

Within RX data and signaling processor 1070, an RX REQCH processor 1240 may demodulate and decode the data symbol estimates for the REQCH and provide decoded request messages to scheduler 1084. Processor 1240 may also reconstruct data symbols for the REQCH based on the decoded request messages and provides the reconstructed data symbols to a data-based channel estimator 1222. An RX data processor 1242 may demodulate and decode the data symbol estimates for traffic and provide decoded traffic data to data sink 1072.

Channel estimator 1222 may derive channel gain estimates for the data subcarriers based on the reconstructed data symbols and the received data symbols. The data subcarriers for the REQCH may be as shown in FIG. 5A, 5B or 5C. A final channel estimator 1230 may receive the channel gain estimates for the pilot and data subcarriers from channel estimators 1212 and 1222 and may derive a channel estimate for each antenna at each UE transmitting on the REQCH. For each UE antenna, channel estimator 1230 may derive a channel impulse response estimate for that UE antenna based on the channel gain estimates for the pilot and/or data subcarriers, filter and/or threshold the channel taps of the channel impulse response estimate, and derive final channel gain estimates for the UE antenna for all or a subset of the K total subcarriers. Channel estimator 1230 may also derive the final channel gain estimates for each UE antenna for all or a subset of the K total subcarriers in other manners, e.g., by filtering or interpolating the channel gain estimates for the pilot and data subcarriers.

A noise and interference estimator 1232 may estimate noise and interference for each UE antenna based on the received pilot symbols from channel estimator 1212 and/or the received data symbols and the reconstructed data symbols from channel estimator 1222. A rate selector 1234 may select a rate for each UE antenna based on the channel estimates and the noise and interference estimates.

Scheduler 1084 may receive the decoded request messages for the UEs and the channel estimates and rates for the antennas at these UEs. Scheduler 1084 may select UEs for SU-MIMO and/or MU-MIMO based on their channel estimates and rates. Scheduler 1084 may also perform subband scheduling based on the channel estimates and rates. Scheduler 1084 may provide a list of UEs scheduled for uplink transmission in each scheduling interval, the uplink resources (e.g., time frequency blocks) assigned to the scheduled UEs, and the rates to use for uplink transmission by the scheduled UEs.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory $1042x$, $1042y$ or 1082 in FIG. 10) and executed by a processor (e.g., processor $1040x$, $1040y$ or 1080). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for wireless communication, comprising:
a processor configured to:
transmit a request for uplink resources on a set of subcarriers of a signaling channel from multiple antennas, wherein the signaling channel comprises a request channel, the set of subcarriers comprises multiple data subcarriers and multiple pilot subcarriers, and the set of subcarriers is distributed across a system bandwidth, wherein pilot symbols are sent on pilot subcarriers in the set of subcarriers and data symbols are sent on data subcarriers in the set of subcarriers; and
receive an assignment of time frequency resources for uplink transmission, in response to the request for uplink resources, wherein the assignment is selected based, at least in part, on the sent pilot symbols and other pilot symbols transmitted from at least one other apparatus; and
a memory coupled to the processor.

2. The apparatus of claim 1, wherein the signaling channel comprises a request channel (REQCH) and the processor is configured to send channel quality indicator (CQI) reports on a CQI channel (CQICH) from a primary antenna among the multiple antennas.

3. The apparatus of claim 2, wherein the processor is configured to:
adjust a transmit power of the CQICH via power control and to set a transmit power of the signaling channel at a predetermined offset from the transmit power of the CQICH.

4. The apparatus of claim 2, wherein the processor is configured to:
send a codeword on the CQICH to indicate that the apparatus desires to transmit the request for uplink resources, and wherein the apparatus is assigned dedicated time frequency resources for transmitting the request.

5. An apparatus for wireless communication, comprising:
a processor configured to:
receive, from multiple antennas of a first user equipment (UE) and at least a second UE, a request for uplink resources on a set of subcarriers of a signaling channel, wherein the signaling channel comprises a request channel, wherein the set of subcarriers comprises multiple data subcarriers and multiple pilot subcarriers, and the set of subcarriers is distributed across a system bandwidth, wherein pilot symbols are received on the multiple pilot subcarriers in the set of subcarriers and data symbols are received on the multiple data subcarriers in the set of subcarriers; and
transmit an assignment of time frequency resources for uplink transmission, to the first UE, in response to the request for uplink resources, wherein the assignment is selected based, at least in part, on the received pilot symbols from the first UE and other pilot symbols received from at least the second UE; and
a memory coupled to the processor.

6. The apparatus of claim 5, wherein the signaling channel comprises a request channel (REQCH).

7. The apparatus of claim 5, wherein the at least one processor is configured to:
estimate channel gains of the multiple pilot subcarriers for the first and at least second UEs based, at least in part, on the received pilot symbols;
demodulate the multiple data symbols from the first and at least second UEs based, at least in part, on the channel gain estimates of the multiple pilot subcarriers; and
estimate channel gains of the multiple data subcarriers for the first and at least second UEs based, at least in part, on the demodulated data symbols,
wherein the assignment of time frequency resources is based, at least in part, on the estimated channel gains of the multiple pilot and data subcarriers.

8. The apparatus of claim 5, wherein the at least one processor is configured to:
decode the requests received from the first and at least second UEs;
reconstruct the data symbols received from the first and at least second UEs based, at least in part, on the decoded requests; and
derive channel estimates for the first and at least second UEs based, at least in part, on the reconstructed data symbols,
wherein the assignment of time frequency resources is based, at least in part, on the derived channel estimates.

9. The apparatus of claim 5, wherein the at least one processor is configured to:
select one or more antennas of the first UE for uplink transmission based, at least in part, on derived estimates of the signaling channel.

10. The apparatus of claim 5, wherein the at least one processor is configured to:
schedule the first UE for subband scheduling.

11. The apparatus of claim 5, wherein the at least one processor is configured to:
estimate a signal to noise ratio (SNR) for each antenna of the UEs based on at least one of the received pilot symbols or the data symbols; and
select a data rate for each of the antennas of the UEs.

12. A method for wireless communication, comprising:
transmitting, by an apparatus, a request for uplink resources on a set of subcarriers of a signaling channel from multiple antennas, wherein the signaling channel comprises a request channel, the set of subcarriers comprises multiple data subcarriers and multiple pilot subcarriers, and the set of subcarriers is distributed across a system bandwidth, wherein pilot symbols are sent on pilot subcarriers in the set of subcarriers and data symbols are sent on data subcarriers in the set of subcarriers; and
receiving, by the apparatus, an assignment of time frequency resources for uplink transmission, in response to the request for uplink resources, wherein the assignment is selected based, at least in part, on the sent pilot symbols and other pilot symbols transmitted from at least one other apparatus.

13. The method of claim 12, wherein the signaling channel comprises a request channel (REQCH) and the method further comprises:
sending channel quality indicator (CQI) reports on a CQI channel (CQICH) from a primary antenna among the multiple antennas.

14. The method of claim 13, further comprising:
adjusting a transmit power of the CQICH via power control and setting a transmit power of the signaling channel at a predetermined offset from the transmit power of the CQICH.

15. The method of claim 13, further comprising:
sending a codeword on the CQICH to indicate that the apparatus desires to transmit the request for uplink resources,
wherein the apparatus is assigned dedicated time frequency resources for transmitting the request.

16. A method for wireless communication, comprising:
receiving, from multiple antennas of a first user equipment (UE) and at least a second UE, a request for uplink resources on a set of subcarriers of a signaling channel, wherein the signaling channel comprises a request channel, wherein the set of subcarriers comprises multiple data subcarriers and multiple pilot subcarriers, and the set of subcarriers is distributed across a system bandwidth, wherein pilot symbols are received on the multiple pilot subcarriers in the set of subcarriers and data symbols are received on the multiple data subcarriers in the set of subcarriers; and
transmitting an assignment of time frequency resources for uplink transmission, to the first UE, in response to the request for uplink resources, wherein the assignment is selected based, at least in part, on the received pilot symbols from the first UE and other pilot symbols received from at least the second UE.

17. The method of claim 16, wherein the signaling channel comprises a request channel (REQCH).

18. The method of claim 16, further comprising:
estimating channel gains of the multiple pilot subcarriers for the first and at least second UEs based, at least in part, on the received pilot symbols;
demodulating the multiple data symbols from the first and at least second UEs based, at least in part, on the channel gain estimates of the multiple pilot subcarriers; and
estimating channel gains of the multiple data subcarriers for the first and at least second UEs based, at least in part, on the demodulated data symbols,
wherein the assignment of time frequency resources is based, at least in part, on the estimated channel gains of the multiple pilot and data subcarriers.

19. The method of claim 16, further comprising:
decoding the requests received from the first and at least second UEs;
reconstructing the data symbols received from the first and at least second UEs based, at least in part, on the decoded requests; and
deriving channel estimates for the first and at least second UEs based, at least in part, on the reconstructed data symbols,
wherein the assignment of time frequency resources is based, at least in part, on the derived channel estimates.

20. The method of claim 16, further comprising:
selecting one or more antennas of the first UE for uplink transmission based, at least in part, on derived estimates of the signaling channel.

21. The method of claim 16, further comprising:
scheduling the first UE for subband scheduling.

22. The method of claim 16, further comprising:
estimating a signal to noise ratio (SNR) for each antenna of the UEs based on at least one of the received pilot symbols or the data symbols; and
selecting a data rate for each of the antennas of the UEs.

23. An apparatus for wireless communication, comprising:
means for transmitting, by an apparatus, a request for uplink resources on a set of subcarriers of a signaling channel from multiple antennas, wherein the signaling channel comprises a request channel, the set of subcarriers comprises multiple data subcarriers and multiple pilot subcarriers, and the set of subcarriers is distributed across a system bandwidth, wherein pilot symbols are sent on pilot subcarriers in the set of subcarriers and data symbols are sent on data subcarriers in the set of subcarriers; and
means for receiving, by the apparatus, an assignment of time frequency resources for uplink transmission, in response to the request for uplink resources, wherein the assignment is selected based, at least in part, on the sent pilot symbols and other pilot symbols transmitted from at least one other apparatus.

24. The apparatus of claim 23, wherein the signaling channel comprises a request channel (REQCH) and further comprising:
means for sending channel quality indicator (CQI) reports on a CQI channel (CQICH) from a primary antenna among the multiple antennas.

25. The apparatus of claim 24, further comprising:
means for adjusting a transmit power of the CQICH via power control and setting a transmit power of the signaling channel at a predetermined offset from the transmit power of the CQICH.

26. The apparatus of claim 24, further comprising:
means for sending a codeword on the CQICH to indicate that the apparatus desires to transmit the request for uplink resources,
wherein the apparatus is assigned dedicated time frequency resources for transmitting the request.

27. An apparatus for wireless communication, comprising:
means for receiving, from multiple antennas of a first user equipment (UE) and at least a second UE, a request for uplink resources on a set of subcarriers of a signaling channel, wherein the signaling channel comprises a request channel, wherein the set of subcarriers comprises multiple data subcarriers and multiple pilot subcarriers, and the set of subcarriers is distributed across a system bandwidth, wherein pilot symbols are received on the multiple pilot subcarriers in the set of subcarriers and data symbols are received on the multiple data subcarriers in the set of subcarriers; and
means for transmitting an assignment of time frequency resources for uplink transmission, to the first UE, in response to the request for uplink resources, wherein the assignment is selected based, at least in part, on the received pilot symbols from the first UE and other pilot symbols received from at least the second UE.

28. The apparatus of claim 27, wherein the signaling channel comprises a request channel (REQCH).

29. The apparatus of claim 27, further comprising:
means for estimating channel gains of the multiple pilot subcarriers for the first and at least second UEs based, at least in part, on the received pilot symbols;
means for demodulating the multiple data symbols from the first and at least second UEs based, at least in part, on the channel gain estimates of the multiple pilot subcarriers; and
means for estimating channel gains of the multiple data subcarriers for the first and at least second UEs based, at least in part, on the demodulated data symbols,
wherein the assignment of time frequency resources is based, at least in part, on the estimated channel gains of the multiple pilot and data subcarriers.

30. The apparatus of claim 27, further comprising:
means for decoding the requests received from the first and at least second UEs;
means for reconstructing the data symbols received from the first and at least second UEs based, at least in part, on the decoded requests; and
means for deriving channel estimates for the first and at least second UEs based, at least in part, on the reconstructed data symbols,
wherein the assignment of time frequency resources is based, at least in part, on the derived channel estimates.

31. The apparatus of claim 27, further comprising:
means for selecting one or more antennas of the first UE for uplink transmission based, at least in part, on derived estimates of the signaling channel.

32. The apparatus of claim 27, further comprising:
means for scheduling the first UE for subband scheduling.

33. The apparatus of claim 27, further comprising:
means for estimating a signal to noise ratio (SNR) for each antenna of the UEs based on at least one of the received pilot symbols or the data symbols; and
means for selecting a data rate for each of the antennas of the UEs.

34. A non-transitory processor-readable medium including instructions stored thereon, comprising:

a first instruction set for transmitting, by an apparatus, a request for uplink resources on a set of subcarriers of a signaling channel from multiple antennas, wherein the signaling channel comprises a request channel, the set of subcarriers comprises multiple data subcarriers and multiple pilot subcarriers, and the set of subcarriers is distributed across a system bandwidth, wherein pilot symbols are sent on pilot subcarriers in the set of subcarriers and data symbols are sent on data subcarriers in the set of subcarriers; and a second instruction set for receiving, by the apparatus, an assignment of time frequency resources for uplink transmission, in response to the request for uplink resources, wherein the assignment is selected based, at least in part, on the sent pilot symbols and other pilot symbols transmitted from at least one other apparatus.

35. A non-transitory processor-readable medium including instructions stored thereon, comprising:

a first instruction set for receiving, from multiple antennas of a first user equipment (UE) and at least a second UE, a request for uplink resources on a set of subcarriers of a signaling channel, wherein the signaling channel comprises a request channel, wherein the set of subcarriers comprises multiple data subcarriers and multiple pilot subcarriers, and the set of subcarriers is distributed across a system bandwidth, wherein pilot symbols are received on the multiple pilot subcarriers in the set of subcarriers and data symbols are received on the multiple data subcarriers in the set of subcarriers; and a second instruction set for transmitting an assignment of time frequency resources for uplink transmission, to the first UE, in response to the request for uplink resources, wherein the assignment is selected based, at least in part, on the received pilot symbols from the first UE and other pilot symbols received from at least the second UE.

* * * * *